United States Patent [19]

Wilkins

[11] Patent Number: 4,785,550

[45] Date of Patent: Nov. 22, 1988

[54] WORKPIECE STOP GAUGE FOR HORIZONTAL BAND SAW

[76] Inventor: Larry C. Wilkins, 1601 Hedden Ct., New Albany, Ind. 47150

[21] Appl. No.: 43,534

[22] Filed: Apr. 28, 1987

[51] Int. Cl.⁴ .............................................. B27B 27/10
[52] U.S. Cl. ....................................... 33/633; 33/202; 33/169 R; 83/467 A; 83/468
[58] Field of Search ................. 33/167, 633, 634, 640, 33/641, 173, 202, 169 R; 269/315; 83/802, 467 R, 467 A, 468

[56] References Cited

U.S. PATENT DOCUMENTS

| | | | |
|---|---|---|---|
| 3,095,673 | 7/1963 | Born, Jr. et al. | 83/468 X |
| 3,175,438 | 3/1965 | Johnson | 83/467 A X |
| 3,813,980 | 6/1974 | Rand et al. | 83/467 |
| 4,256,000 | 3/1981 | Seidel | 83/467 R X |
| 4,339,972 | 7/1982 | Wepner et al. | 83/467 R X |
| 4,434,693 | 3/1984 | Hosoi et al. | 83/468 |

*Primary Examiner*—William D. Martin, Jr.
*Attorney, Agent, or Firm*—Woodard, Emhardt, Naughton, Moriarty & McNett

[57] ABSTRACT

A linear position index bar is fixed to the frame of a horizontal band saw adjacent the workpiece support table. A linear indexing clamp assembly is mounted to the bar and movable along it to primary indexing locations. A workpiece end locator stop is micrometer mounted to the clamp assembly and associated with a dial indicator for precision indication of positions within a range of one measuring increment of the index bar. Major changes of stock stop position from the saw blade are done by moving the index clamp. Precision positioning is accomplished with a decimal setting knob on the micrometer.

10 Claims, 2 Drawing Sheets

WORKPIECE STOP GAUGE FOR HORIZONTAL BAND SAW

BACKGROUND OF THE INVENTION

This invention relates generally to workpiece locators for cutoff machines or forming machines, and more particularly to an adjustable stop for establishing the length of bar stock or the like to be cut off with a horizontal endless band saw, cold saw, friction saw, shear, tube cutter, or press brake.

In the use of horizontal band saws, when several pieces of identical length are to be cut off the stock, a stock length stop is used to locate the stock before each cut. The normal procedure is to extend the stock through the saw, take a measuring tape and measure from the side of the blade to the end of the stock to obtain the desired cut off length, clamp the stock in the vise, swing the stock length stop down into position facing the end of the stock, move the stop toward the end of the stock, touch the end of the stock with the stop, and lock the stop mount into correct longitudinal position. Then the stop is swung up from the end of the stock, the saw is started and the stock is cut. Following the cut, the overall length of the cutoff workpiece can be measured. At that time, any significant effect of the saw kerf or misalignment or drift or wobble of the blade, will be evident in the measured length of the cutoff piece being less than expected. So, the end stop mount must be unlocked, moved appropriately to compensate for the error, and locked again. Then another piece of stock must be cut and measured. If the length is still unsatisfactory, the stop positioning procedure must be again repeated. While this is a procoedure that can be followed and eventually result in obtaining pieces of the correct length, it can be tedious, and does not facilitate the cutting of pieces of various lengths. Consequently, it discourages interruption of production cutting to cut a piece or pieces of a different length than those in the production run.

While there are stop length gages with position indicating dials and which can be obtained as original equipment accessories with horizontal band saws, I am not aware of any devices heretofore available which are relatively inexpensive, easily used, accurate and suitable for retrofitting to existing saws.

The present invention is addressed to the need for an inexpensive stock length stop suitable for original equipment or retrofit installation on saws or other machines as mentioned above, and for quickly establishing the correct workpiece stop location, and facilitating selection of various desired stop locations.

SUMMARY OF THE INVENTION

Described briefly, according to a typical embodiment of the present invention, an adjustable stop assembly includes a linear position index bar with means to fix it to the frame of the saw adjacent the workpiece support. A linear indexing clamp assembly is mounted to the bar, and is movable along it to primary indexing locations. A workpiece end locator stop is micrometer mounted to the clamp assembly and associated with an indicator for precision indication of stop position. Major changes of distance of the stop from the saw blade are made by moving the index clamp assembly. Precision positioning is accomplished with the micrometer.

DESCRIPTION OF THE PREFERRED EMBODIMENT

Figure 1:
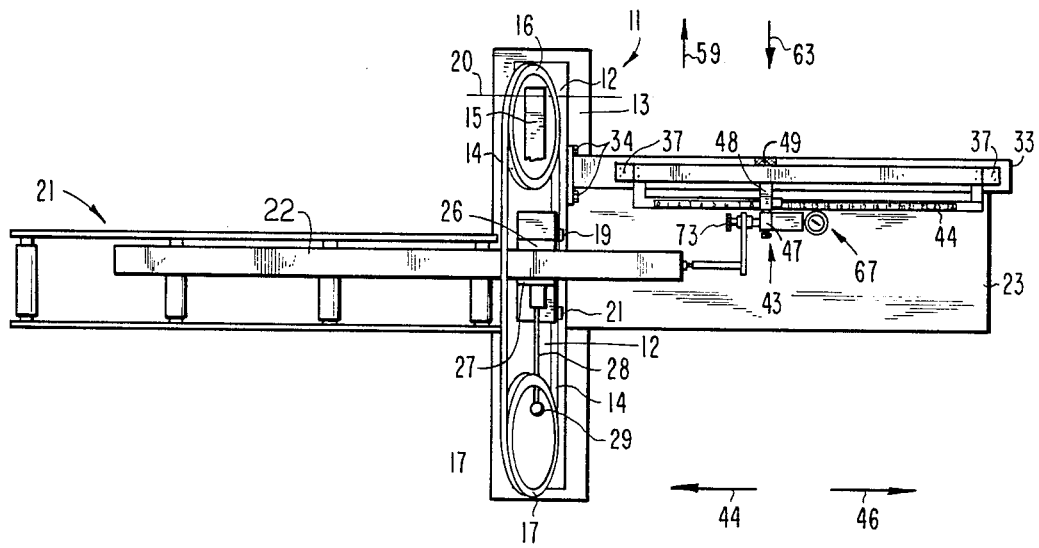
FIG. 1 is a diagrammatic top plan view of a horizontal band saw with the gauge of the present invention thereon.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings in detail, and particularly to FIG. 1, a conventional horizontal band saw 11 is shown symbolically with the saw body 12 and a coolant trough 13 supported on legs (not shown). the endless steel band blade 14 operates around the wheels 16 and 17 slant-mounted on the saw head frame 15 (shown fragmentarily) and is supported adjacent the cutting area 18 by suitable guides 19 and 21 also mounted on the saw head. The saw head is hinged to the saw body 12 on horizontal axis 20 to swing down to and up from cutting position.

A roller table 21 is provided at the input side for supporting stock 22 thereon. A plate table 23 is provided at the discharge side to support pieces that are cut off from the stock 22. Virtually any stock holding vise can be used. The illustrated example includes the anvil jaw 26, clamp jaw 27, operating rod 28 and knob 29. The clamp jaw is slidable on saw body 12. All of the features thus far described are conventional. Perhaps the best known brand for such horizontal band saws in the United States is DoAll. The DoAll C-916 horizontal band saw is an example.

The manner of setting up such a saw for cutting pieces of a given length, has been described above. In the illustrated embodiment of the present invention, the conventional stock length stop assembly has been removed from the saw. A mounting adapter in the form of a length of inverted channel section 33, is fastened to the saw body 12 by four cap screws 34 through a mounting flange 35 at the end of the channel 33 and screwed into the machine frame 12. An end rest or leg (not shown) is provided from the floor up to the underside of the outer end of the channel to avoid damage to the channel which might otherwise result from someone leaning or sitting on it. A gauge mounting bar 37 is fastened to the channel 33 with four screws 38. Posts 39, fixed to mounting bar 37, support an index bar 41 and bar 42.

An indicator carrier assembly 43 is mounted on the index bar 41 and slidable longitudinally thereon toward and away from the saw blade in the direction of the arrows 44 and 46, respectively. The indicator carrier assembly includes a base 47, and slide 48, the latter being guidingly received on the index bar 41.

Figure 3:
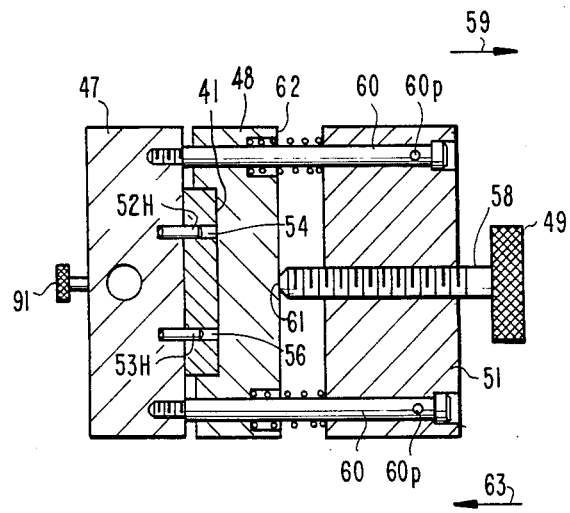
FIG. 3 is a further enlarged sectional view of the mounting of the gauge slide on the index bar.

An indexing clamp knob 49 is threaded into a clamp knob mount 51 FIG. 3. The base 47 has dowel pins secured therein with ends 52H and 53H, respectively, received in two of the index pin holes 54 and 56, respectively, of the index bar. This precisely locates the base 47 longitudinally of the index bar. The indexing clamp knob 49 is at the end of the clamp release screw 58. If the knob is turned to thread the screw in the direction of arrow 59 so that it moves out of the mount 51, it will open up a space between the end 61 of the screw and the face 62 of the slide 48. Thereupon it is possible to push the mount 51 in the direction of the arrow 63. Because screws 60 are pinned at 60p to mount 51, pushing the mount 51 in the direction of the arrow 63 forces the base 47 in the same direction sufficiently to push the index pin ends 52H and 53H out of the holes 54 and 56, respectively, and enable sliding the base 47 along the index bar in the direction of arrow 44 or 46 FIG. 1. This type of slide mounting is shown in my U.S. Pat. No. 4,525,931, issued July 2, 1985, the disclosure of which, to any extent needed, is incorporated herein by reference.

Figure 4:
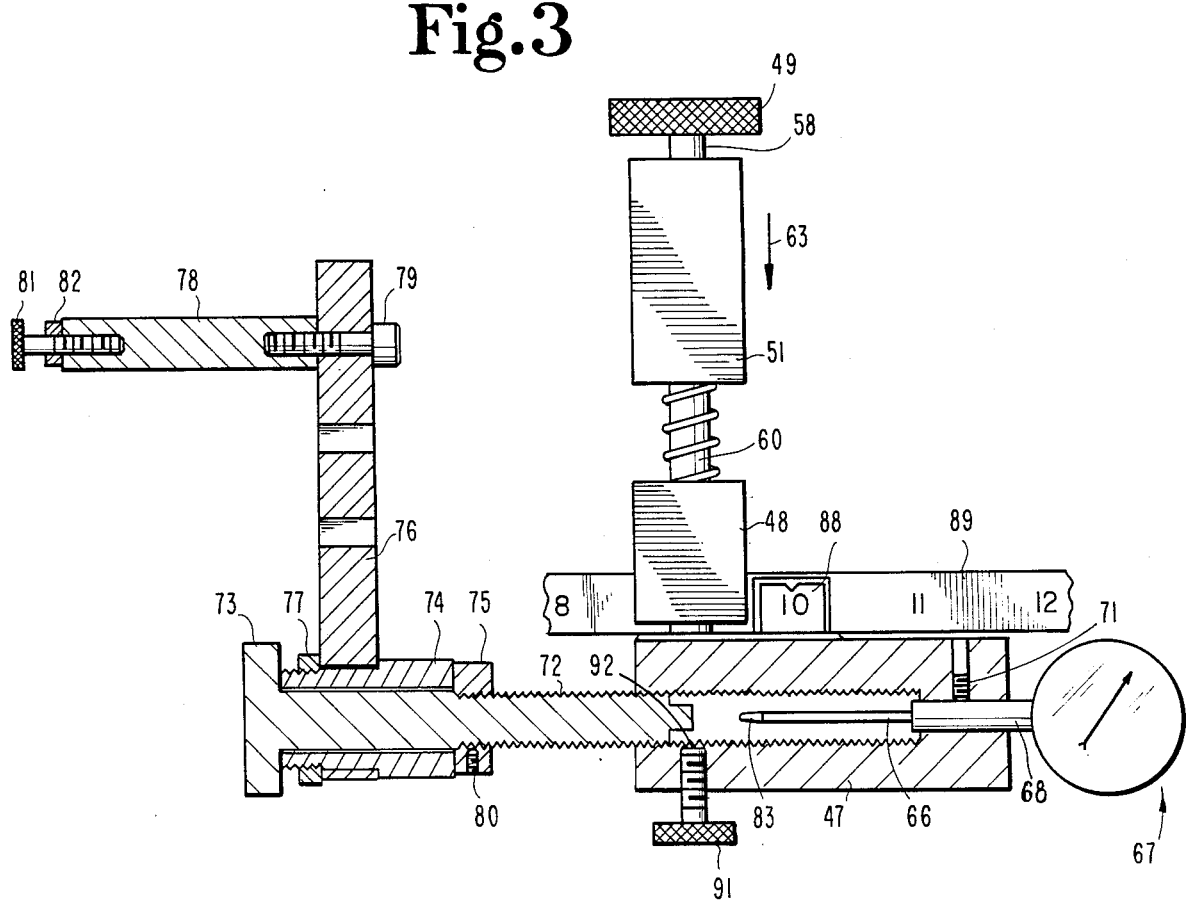
FIG. 4 is an enlarged longitudinal sectional view through the micrometer portion of the gauge.

Referring now to FIG. 4, the base 47 actually serves as a housing for the actuator stem 66 of a dial indicator gauge assembly 67. The gauge base cylinder 68 is received in an aperture in base 47 and secured in place by a set screw 71. A micrometer adjusting screw 72 is threaded into the housing 47 and has a knurled knob 73 at the outer end. The unthreaded shank of this screw receives a stop arm carrier bushing 74 which is freely rotatable but close fitting on the screw shank. A stop arm 76 is secured to this bushing by a retaining nut 77 threaded onto the end of the bushing and holding the arm against a shoulder on the bushing. A stop extension 78 is secured to the arm 76 by a bolt 79. The extension is at the outermost location on the arm. There are two other holes at closer distances to the axis of the micrometer assembly, as shown, either of which could be used as the extension mounting location. The stop 81 is threaded into the extension 78 and secured by a lock nut 82. Bushing 74 is axially confined (with about 0.001 inch end clearance) between the knob 73 and a nut 75 threaded onto the micrometer threads of screw 72 and secured in position thereon by a set screw 80.

In FIG. 4, the micrometer screw is shown almost entirely unscrewed out of the housing/base 47. Normally, it would be screwed well into the housing so that it is not only securely supported in the housing, but also is against the distal end 83 of the micrometer stem 66.

Figure 2:
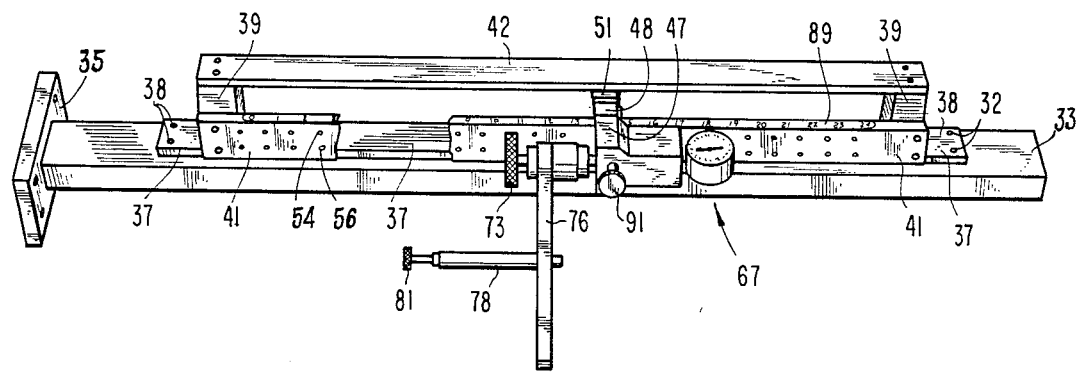
FIG. 2 is a perspective view of the gauge of the present invention on a larger scale than in FIG. 1.

As evident from FIG. 2, there is a plurality of pairs of index holes 54 and 56 in index bar 41, the holes in each pair, such as 54 and 56, being in vertical alignment, and the pairs being longitudinally spaced one inch from each other. The range of the dial indicator 67 is one inch. Consequently, the dial indicator is capable of reading stop locations anywhere within the one inch increments of the index hole locations on the index bar. The slide 48 has an index window 88 (FIG. 4) which will register with any one of the twenty-four legends on the top edge 89 of the gauge of the index bar. These legends begin at zero and, on a 24 inch bar, will continue in the sequence from 1 through 23.

The indicator dial for the dial indicator is set up to read in thousandths of an inch, with the large pointer reading in thousandths. Accordingly, the knob 73 is designated as a "decimal setting knob". It should be understood that this invention can be employed as well with the metric measurement system as with the English system.

OPERATION

To set up the gauge, the indexing clamp base 47 is positioned so that the window 88 thereof is in registry with the zero legend on the index bar. The decimal setting knob 73 is adjusted so that the dial indicator reads zero. The micrometer adjusting lock knob 91 is then turned so that the lock screw end 92 engages the threads of screw 72 to prevent the screw 72 from turning. The end of the lock screw should be made of a relatively soft plastic or other material to avoid damage to the micrometer threads. Then, the lock nut 92 is loosened, and the stock stop 81 is adjusted by turning as needed so as to just touch the saw blade. Then the nut 82 is tightened to lock the stop in this adjusted position just touching the saw blade. Having done this, the gauge is ready for use.

In use, for example, to cut parts that are 10.420 inches long, the indexing clamp knob 49 is turned to loosen the clamp screw. Then the mount 51 is pushed in the direction of arrow 63. This pushes the dowel pin ends 52H and 53H from the index holes in the index bar. Then the slide is pushed in the direction of arrow 46 to the location where the window 88 is aligned with the legend "10" on the index bar. The force in the direction of arrow 63 on the knob 57 is then released from the knob to permit the dowel pin ends 52H and 53H to enter the index holes for the 10 inch index position. Then the knob 57 is tightened.

With the slide properly located, the decimal lock knob 91 is loosened and the decimal setting knob 73 is turned until the dial indicator reads 0.420. Then the decimal lock knob is tightened to maintain that setting.

Now that the gauge is set, the stock 22 is pulled to the right in the direction of arrow 46 until the end of it touches the stop 81. Then the vise is clamped on the stock, the saw is started, and the blade placed against the stock. When it is cut through the stock, the cut off piece may be removed and checked for length. If the length is not exactly accurate, the difference can be noted. Then the micrometer adjustment lock knob 91 can be released, the decimal setting knob turned to advance the dial indicator the amount needed to compensate for any error, and then the lock knob 91 is tightened again. Subsequent pieces should all be precisely 10.420 inches long. Of course, before the saw is started, the stop arm 76 is swung up so that the stop 81 is out of the way of the stock to thereby avoid risk of damage to the gauge or the blade during the cutting operation.

If it is necessary to then change the setting, whether it be to cut a piece of the same stock but in a different length, or to cut a new piece of stock, the desired length can be established in the same way as described above, very quickly. Then, if it is desired to resume cutting stock to the previously cut length of 10.420 inches, it is a simple matter to restore the stop to the prior position.

From the foregoing description, and recognizing experience with horizontal band saws, it will be recognized that it is important that the index bar be perpendicular to that portion of the blade which is cutting the stock. In order to be certain that this is the case, it is desirable to drill and tap the holes for the screws mounting the gauge mounting bar 37 to the adapter 33, after the adapter has been mounted on the saw frame. Starting with one hole and a mounting bolt secured in the hole and pivotally connecting the mounting bar to the adapter bar, the outer end of the mounting bar can be swung slightly to the front and to the rear and temporarily clamped (with a C-clamp) in position on the adapter 33 where it is believed to be perpendicular to the blade. Then one can take measurements between the stop 81 and the blade with known standards at the midpoint and maximum distance of the slide 48 from the zero reference point. When the correct position of the mounting bar 37 on adapter 33 has been determined, the other three of the holes can be drilled, tapped and the bolts installed. Thus, the perpendicular relationship of the index bar to the cutting portion of the blade can be established.

It has been mentioned above that this invention relates to various types of cutting machines and brakes. In either case, whether the workpiece treating member be some kind of cutting band, wheel or blade in a cutoff machine, or a bending die in a brake or bending machine, reliable location of the stop relative to the path of movement of the treating member can be achieved, and readily changed, if desired. Also, while the illustrated embodiment shows a dial indicator used to precisely indicate the position of the stop relative to the path, it should be recognized that other types of position sensors and indicators can also be used within the scope of the invention. Therefore, while the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A workpiece stop gauge assembly for a band saw and comprising:
   an elongated mounting adapter for attachment to a horizontal band saw, with the adapter perpendicular to the path of travel of the band saw blade where the workpiece is cut;
   an index bar attached to said adapter and extending perpendicular to the said path.
   a slide mounted on said index bar and slidable longitudinally thereof;
   a locator base associated with said slide and movable therewith longitudinally of said index bar;
   an indicator mount secured to said locator base;
   a dial indicator fastened to said indicator mount and having an actuating stem extending longitudinally in a cavity in said indicator mount;
   a micrometer adjusting screw threaded into said indicator mount and having an end aligned with and operably engagable with said actuator stem;
   a stop arm carrier bushing received on said adjusting screw and rotatable thereon about the axis of said screw;
   bushing locating collars on said micrometer adjusting screw, to control the longitudinal position of said bushing on said screw;
   a stop arm affixed to said bushing and extending radially from the axis of said bushing;
   a stop extension mounted near the distal end of said stop arm and extending longitudinally therefrom parallel to the axis of said micrometer adjusting screw and in the direction opposite from said indicator mount; and a stop post screw threaded into said stop extension and having an end adapted to engagement of the workpiece against it for location of the workpiece;
   said stop arm and bushing being rotatable on said adjusting screw about the axis of said adjusting screw to permit movement of the stop from a position useful for engagement by a workpiece, to a position avoiding interference with movement of the workpiece in the direction of the axis of said adjusting screw.

2. The gauge assembly of claim 1 wherein, said dial indicator has a face which faces in a direction perpendicular to the axis of said micrometer screw;
   said index bar has a face with dimensional indicia facing in the same direction as faced by the indicator face; and
   said slide has a window thereon faced by said indicia and through which said indicia is visible, and with a reference mark thereon to designate alignment of said slide with a certain location with respect to a reference point on said indicator index bar.

3. The gauge assembly of claim 1 wherein:
   said indicator mount is internally threaded and receives the threads of said micrometer adjusting screw whereby the longitudinal location of said adjusting screw with respect to said indicator mount is infinitely adjustable and, with said adjusting screw contacting the end of said actuating stem of said dial indicator, will move said indicator in response to longitudinal adjustment of said screw in said housing by turning said screw.

4. The gauge assembly of claim 3 and further comprising:
   a locking knob to adjust and lock the adjusting screw in the indicator mount at a desired position therein.

5. The gauge assembly of claim 4 and further comprising:
   a knurled knob at one of the collars on said adjusting screw to facilitate longitudinal micrometer adjustment of said adjusting screw in said housing by turning the knob.

6. A workpiece stop gauge assembly for a cutting or bending machine or the like having a workpiece treating member movable in a path during treating engagement with the workpiece, said assembly comprising:
   an elongate mounting adapter for attachment to the machine, with the adapter perpendicular to the said path of travel of the workpiece treating member where the workpiece is treated;
   an index bar attached to said adapter and extending perpendicular to the said path.
   a slide mounted on said index bar and slidable longitudinally thereof;
   a locator base associated with said slide and movable therewith longitudinally of said index bar;
   a sensor mount secured to said locator base;
   a sensor fastened to said sensor mount and having an actuating stem extending longitudinally in a cavity in said sensor mount;
   a micrometer adjusting screw threaded into said sensor mount and having an end aligned with and operable engagable with said actuator stem;
   a stop arm carrier bushing received on said adjusting screw and rotatable thereon about the axis of said screw;
   bushing locating collars on said micrometer adjusting screw, to control the longitudinal position of said bushing on said screw;

a stop arm affixed to said bushing and extending radially from the axis of said bushing;

a stop extension mounted near the distal end of said stop arm and extending longitudinally therefrom parallel to the axis of said micrometer adjusting screw and in the direction opposite from said sensor mount; and a stop post screw threaded into said stop extension and having an end adapted to engagement of the workpiece against it for location of the workpiece;

said stop arm and bushing being rotatable on said adjusting screw about the axis of said adjusting screw to permit movement of the stop from a position useful for engagement by a workpiece, to a position avoiding interference with movement of the workpiece in the direction of the axis of said adjusting screw.

7. A workpiece stop gauge assembly for a cutting or bending machine or the like having a workpiece treating member movable in a path during treating engagement with the workpiece, said assembly comprising:

a mounting adapter for attachment to the machine;

an elongate index member attached to said adapter and extending perpendicular to the said path of travel of the workpiece treating member;

carrier means on said index member and slidable longitudinally thereof;

an indicator having actuating means;

micrometer adjusting screw means operably associated with said actuating means; and workpiece locating stop means received on said carrier means and including a workpiece stop coupled to said micrometer adjusting screw, whereby stop position is related to said indicator.

8. The assembly of claim 7 wherein said carrier means include:

a locator base movable longitudinally of said index member;

said indicator being fastened to said locator base and having its actuating means include an actuator stem;

said micrometer adjusting screw being threaded into said locator base and having an end operably associated with said actuator stem;

said stop means including a stop arm received on said adjusting screw and extending radially from the axis of the screw, and locating means on said micrometer adjusting screw to fix the longitudinal position of said arm on said screw.

9. The assembly of claim 8 wherein:

said stop arm has said stop at a distal end thereof, and said arm is rotatable on said adjusting screw about the axis of said adjusting screw to permit movement of the stop from a position useful for engagement by a workpiece, to a position avoiding interference with movement of the workpiece in the direction of the axis of said adjusting screw.

10. The assembly of claim 8 and wherein said stop means include:

a stop extension mounted near the distal end of said stop arm and extending longitudinally therefrom parallel to the axis of said micrometer adjusting screw; and a stop post screw threaded into said stop extension and having an end adapted to engagement of the workpiece against it for location of the workpiece whereby said end is said workpiece locating stop.

* * * * *